(12) United States Patent
Hecht et al.

(10) Patent No.: US 12,293,592 B2
(45) Date of Patent: May 6, 2025

(54) VEHICLE TRAJECTORY PLANNING

(71) Applicant: GM GLOBAL TECHNOLOGY OPERATIONS LLC, Detroit, MI (US)

(72) Inventors: Ron M. Hecht, Raanana (IL); Ariel Telpaz, Givat Haim Meuhad (IL); Yael Shmueli Friedland, Tel Aviv (IL); Asaf Degani, Tel Aviv (IL); Michael Baltaxe, Kfar Sava (IL); Andrea Forgacs, Kfar Sava (IL)

(73) Assignee: GM Global Technology Operations LLC, Detroit, MI (US)

( * ) Notice: Subject to any disclaimer, the term of this patent is extended or adjusted under 35 U.S.C. 154(b) by 201 days.

(21) Appl. No.: 18/171,517

(22) Filed: Feb. 20, 2023

(65) Prior Publication Data

US 2024/0282121 A1 Aug. 22, 2024

(51) Int. Cl.
| | |
|---|---|
| *G06V 20/58* | (2022.01) |
| *B60W 50/14* | (2020.01) |
| *B60W 60/00* | (2020.01) |
| *G06V 20/56* | (2022.01) |

(52) U.S. Cl.
CPC .......... *G06V 20/588* (2022.01); *B60W 50/14* (2013.01); *B60W 60/001* (2020.02); *G06V 20/58* (2022.01); *B60W 2050/146* (2013.01); *B60W 2420/403* (2013.01); *B60W 2552/53* (2020.02)

(58) Field of Classification Search
CPC .......... G06V 20/56–588; B60W 50/14; B60W 60/001; B60W 2050/146; B60W 2420/403; B60W 2552/53
See application file for complete search history.

(56) References Cited

U.S. PATENT DOCUMENTS

| | | | | |
|---|---|---|---|---|
| 2011/0242328 | A1* | 10/2011 | Twede | H04N 23/84 |
| | | | | 348/E5.09 |
| 2013/0058528 | A1 | 3/2013 | Liu et al. | |
| 2013/0085642 | A1* | 4/2013 | Dankers | H04N 25/707 |
| | | | | 702/155 |
| 2016/0307053 | A1* | 10/2016 | Aycock | G06V 40/172 |
| 2017/0010618 | A1* | 1/2017 | Shashua | B60W 30/14 |
| 2017/0161572 | A1* | 6/2017 | Zhao | G06V 10/25 |
| 2017/0373384 | A1* | 12/2017 | MacNeille | H01Q 13/106 |
| 2018/0314258 | A1* | 11/2018 | Brew | B60W 40/06 |
| 2019/0019413 | A1* | 1/2019 | Yun | B60W 60/0053 |
| 2019/0346855 | A1* | 11/2019 | Chase | G05D 1/0242 |
| 2021/0356572 | A1 | 11/2021 | Kadambi et al. | |
| 2023/0134302 | A1* | 5/2023 | Herman | G06V 10/147 |
| | | | | 382/104 |

* cited by examiner

*Primary Examiner* — Keith D Bloomquist
(74) *Attorney, Agent, or Firm* — Quinn IP Law

(57) ABSTRACT

A system for vehicle trajectory planning. The system may include a polarized camera system configured to generate polarized images of a roadway to be driven over with a vehicle, a prior controller configured to generate a prior for the roadway based at least in part on the polarized images, and a driving assistance system configured to provide a driving assistance according to the prior.

20 Claims, 5 Drawing Sheets

VEHICLE TRAJECTORY PLANNING

INTRODUCTION

The present disclosure relates to systems and methods of vehicle trajectory planning, such as but not necessarily limited to providing vehicle trajectory planning according to polarized images captured for a roadway to be driven over.

Vehicle trajectory planning may relate to methods and system for assisting in planning paths, routes, patterns, or other directional capabilities for guiding a vehicle. In the case of automobiles or other land-based vehicles traveling over a roadway, it may be desirable to plan the vehicle's trajectory to avoid obstacles and other impediments within the roadway, at least as much as possible. The ability of a trajectory planning system to correspondingly guide a vehicle around such obstacles may be reliant on how well the trajectory planning system is able to accurately detect the roadway and the obstacles thereon or associated therewith. Even when such trajectory planning systems may be able to detect the roadway and the obstacles, it may be challenging or problematic for the system to identify a suitable way around the obstacles, particularly since the mere identification of the object may be insufficient for the trajectory planning system to adequately ascertain and factor in roadway constraints and other influences and limitations on how the vehicle might avoid the obstacles while still obeying norms and rules of the roadway.

SUMMARY

One non-limiting aspect of the present disclosure relates to a trajectory planning system for guiding a vehicle over a roadway according to how other vehicles previously traversed the same roadway. The trajectory planning system may be configured to capture polarized images of the roadway, and based on polarization information included with the polarized images, such as but not necessarily limited to angle of linear polarization (AoLP) and degree of linear polarization (DoLP), to determine one or more prior pathways used by the other vehicles when traveling thereover. The prior pathways may be used to ascertain how the other vehicles traversed the same roadway, and thereby, how those vehicles avoided or otherwise traversed the obstacles and other impediments. The prior pathways may enable the system to ascertain and factor in roadway constraints and other influences on how the vehicle might avoid the obstacles while obeying the norms and rules of the roadway, such as by following one or more of the prior pathways. The vehicle trajectory planning system, may, for example, generate a prior to represent the prior pathways, optionally with an identification of a dominate or most used pathway, and based thereon generate a driving assistance to guide the vehicle according to how the prior vehicles navigated the roadway. The driving assistance may include guiding the vehicle according to the prior paths with visual cues for a driver of the vehicle to follow and/or directions for instructing an automated driving system of the vehicle to follow.

One non-limiting aspect of the present disclosure relates to a system for vehicle trajectory planning. The system may include a polarized camera system configured to generate polarized images of a roadway to be driven over with a vehicle, the polarized images capturing polarization information for the roadway. The system may further include a prior controller configured to generate a prior for the roadway based at least in part on the polarization information, with the prior representing one or more prior pathways other vehicles previously traversed when traveling over the roadway. The system may still further include a driving assistance system configured to provide a driving assistance according to the prior, with the driving assistance providing guidance for driving the vehicle over the roadway relative to one or more of the prior pathways.

The prior may be configured to identify a dominant pathway of the prior pathways, the dominant pathway representing the one of the prior pathways most traversed by the other vehicles.

The driving assistance may be configured to guide the vehicle relative to the dominant pathway by providing one or more visual cues to a driver of the vehicle.

The prior may be configured to additionally represent one or more obstacles within the roadway.

The driving assistance may be configured to generate one or more of the visual cues to guide the vehicle relative to the obstacles.

The visual cues may include a pathway representation and one or more valence lines, optionally with the pathway representation visually identifying the dominant pathway, the valence lines visually identify the proximity and potential relation of the vehicle to the obstacle(s).

The driving assistance may be configured to guide the vehicle relative to the dominant pathway by providing one or more driving directions to an automated driving system of the vehicle, optionally with the driving directions instructing the automated driving system to autonomously navigate the vehicle along the dominant pathway.

The prior may be configured to identify the dominant pathway as a most polarized one of the prior pathways.

The prior controller may be configured to determine surface quality for the prior pathways based at least in part on an angle of linear polarization (AoLP) and a degree of linear polarization (DoLP) captured with the polarized images.

The prior controller may be configured to identify in the prior a dominant pathway of the prior pathways based on a differentiation in the surface qualities of the prior pathways.

The system may include a red, green, and blue (RGB) camera system configured to generate RGB images of the roadway and an imaging module configured to combine corresponding ones of the polarized images and the RGB image to generate layered images of the roadway, with the layered images each including a polarized layer, a red layer, a green layer, and a blue layer.

The prior controller may be configured to generate the prior from the layered images and to identify in the a dominant pathway of the prior pathways, with the dominant pathway representing the one of the prior pathways most traversed by the other vehicles. The system may include a lane detection system configured to generate lane markers from the layered images, with the lane markers representing driving lanes included on the roadway, and an obstacle detection system configured to generate obstacle markers from the layered images, with the obstacle markers representing obstacles included on the roadway. The driving assistance may be configured to provide one or more visual cues for guiding the vehicle, the visual cues visually identifying to a driver of the vehicle the dominant pathway, the lane markers, and the obstacles.

The system may include a display system configured to display the visual cues to the driver through a heads up display (HUD) system, an infotainment system, and/or an augmented reality system onboard the vehicle.

One non-limiting aspect of the present disclosure relates to a system for vehicle trajectory planning. The system may include a polarized camera system configured to generate polarized images of a roadway to be driven over with a vehicle, a red, green, and blue (RGB) camera system configured to generate RGB images of the roadway, an imaging module configured to combine corresponding ones of the polarized images and the RGB image to generate layered images of the roadway, a prior controller configured to generate a prior for the roadway from the layered images with the prior representing one or more prior pathways other vehicles previously traversed when traveling over the roadway and one or more obstacles within the roadway, and a driving assistance system configured to provide a driving assistance according to the prior with the driving assistance providing guidance for driving the vehicle over the roadway relative to the obstacles and one or more of the prior pathways.

The prior controller may be configured to determine surface quality for the prior pathways based at least in part on an angle of linear polarization (AoLP) and a degree of linear polarization (DoLP) captured with the polarized images and identify in a dominant pathway based on a differentiation in the surface qualities of the prior pathways, with the dominant pathway being a most traveled one of the prior pathways.

The driving assistance may be configured to guide the vehicle relative to the dominant pathway and the obstacles by providing one or more visual cues to a driver of the vehicle.

The driving assistance may be configured to guide the vehicle relative to the dominant pathway and the obstacles by providing one or more driving directions to an automated driving system of the vehicle.

One non-limiting aspect of the present disclosure relates to a system for vehicle trajectory planning. The system may include a polarized camera system configured to generate polarized images of a roadway to be driven over with a vehicle. The system may further include a prior controller configured to: determine one or more prior pathways other vehicles previously traversed when traveling over the roadway based at least in part on an angle of linear polarization (AoLP) and a degree of linear polarization (DoLP) captured with each the polarized images; and identify within a prior a dominant pathway of the prior pathways as a one of the prior pathways most traversed by the other vehicles. The system may still further include a driving assistance system configured to generate one or more visual cues according to the prior, with the visual cues providing visual guidance to driver of the vehicle to assist in driving the vehicle over the roadway relative to the dominant pathway.

The system may include a display system configured to display the visual cues to the driver through a heads up display (HUD) system, an infotainment system, and/or an augmented reality system onboard the vehicle.

These features and advantages, along with other features and advantages of the present teachings, are readily apparent from the following detailed description of the modes for carrying out the present teachings when taken in connection with the accompanying drawings. It should be understood that even though the following figures and embodiments may be separately described, single features thereof may be combined to additional embodiments.

BRIEF DESCRIPTION OF THE DRAWINGS

The accompanying drawings, which are incorporated into and constitute a part of this specification, illustrate implementations of the disclosure and together with the description, serve to explain the principles of the disclosure.

DETAILED DESCRIPTION

As required, detailed embodiments of the present disclosure are disclosed herein; however, it is to be understood that the disclosed embodiments are merely exemplary of the disclosure that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

Figure 1:
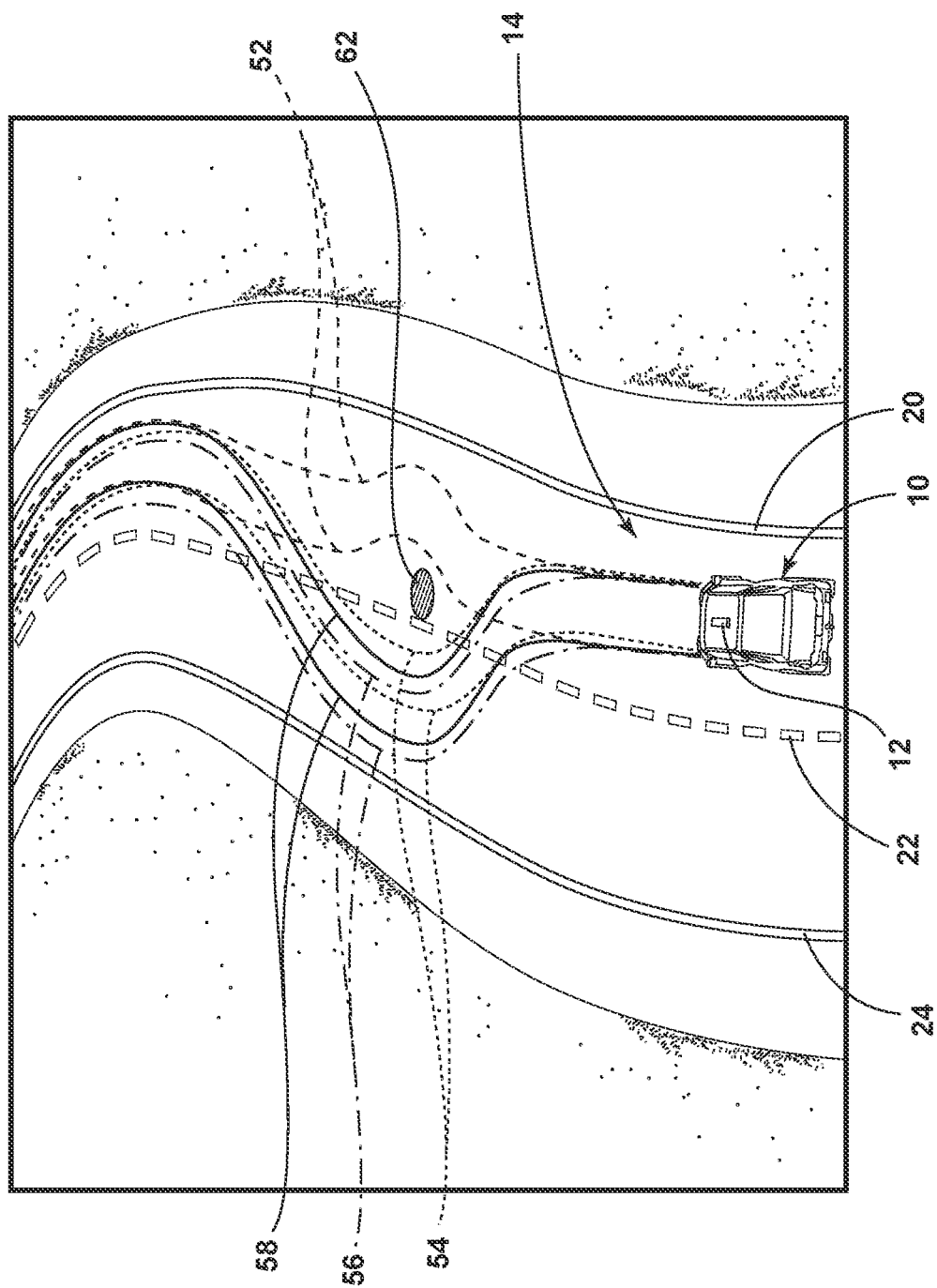
FIG. 1 illustrates a vehicle having a trajectory planning system in accordance with one non-limiting aspect of the present disclosure.

FIG. 1 illustrates a vehicle 10 having a trajectory planning system 12 in accordance with one non-limiting aspect of the present disclosure. The vehicle 10 is illustrated as an automobile or other land-based vehicle configured to travel upon a roadway or other surface 14. This is done for exemplary purposes as the present disclosure fully contemplates the trajectory planning system 12 being configured for and beneficial in providing trajectory planning for other types of vehicles, including non-land-based vehicles, such as but not necessarily limited to aircraft and/or watercraft. The roadway 14 is shown as including a plurality of lanes differentiated with a plurality of lane markers 20, 22, 24, which may be arranged in the illustrated manner for right-handed traffic, with the vehicle 10 traveling forwardly on a right-hand side relative to the two-away traffic divider lane marker 22 and within the roadside lane markers 20, 24. The roadway 14 is illustrated with the noted markers 20, 22, 24 and right-hand traffic configuration for non-limiting purposes in order to demonstrate one set of driving rules and norms commonly employed for surface traffic. The present disclosure fully contemplates its use and application in guiding the vehicle 10 relative to other lane markers, rules, norms, etc.

Figure 2:
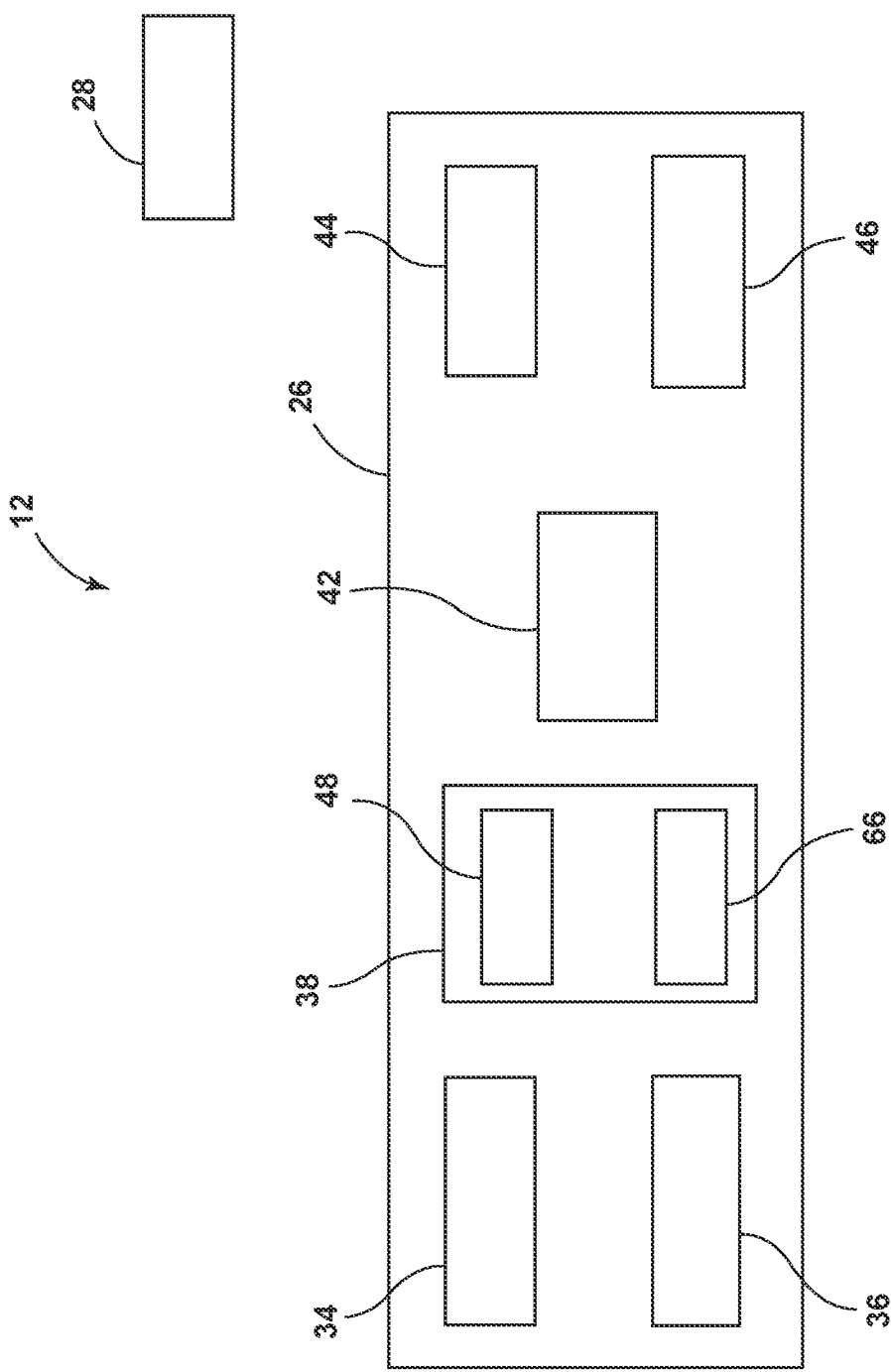
FIG. 2 illustrates a schematic view of the trajectory planning system in accordance with one non-limiting aspect of the present disclosure.

FIG. 2 illustrates a schematic view of the trajectory planning system 12 in accordance with one non-limiting aspect of the present disclosure. The system 12 may include a trajectory planning controller 26 onboard the vehicle 10 and/or one or more remote systems 28 in wireless communication therewith, such as a back-office server or other entity in communication therewith over a cellular or other wireless network. The trajectory planning controller 26 may include or be in communication with one or more additional systems 34, 36, 38, 42, 44, 46 onboard the vehicle 10, which are shown to include a polarized camera system 34, a visual or red, green, and blue (RGB) camera system 36, a prior system 38, a driving assistance system 42, a display system 44, and an automated driving system 46. The trajectory planning controller 12 and/or the other systems 34, 36, 38, 42, 44, 46 may be configured to operate according to a plurality of non-transitory instructions stored on the associated computer readable storage medium, which when executed with a related processor, may be sufficient to facilitate the operations, functions, and other processes associated with the vehicle 10 trajectory planning of the present disclosure.

The polarized camera system 34 may include one or more cameras (not shown) configured to capture polarized images of an environment associated with the vehicle 10. The polarized camera system 34, for example, may be configured to capture polarized images for the roadway 14 to be driven over with the vehicle 10. The polarized images may be captured on a frame-by-frame basis or at other intervals as the vehicle 10 travels upon the roadway 14, e.g., the polarized camera system may be configured to capture the polarized images at a rate of n frames per second (FPS) from one or more of the polarized cameras. The polarized images may capture polarization information for the roadway 14 and other portions of the environment within the field of view of the corresponding polarized camera. One non-limiting aspect of the present disclosure contemplates the polarized images including polarization information sufficient for indicating angle of linear polarization (AoLP) and a degree of linear polarization (DoLP) for objects, surfaces, textures, artifacts, etc. therein. The polarization information may provide information regarding a surface quality of the portions of the roadway 14 captured within each of the polarized images.

The prior system 38 may include a prior controller 48 configured to process the polarized images for purposes of generating a prior for the roadway 14. The prior may be a map, a listing, or other data set configured to represent one or more prior pathways 52, 54, 56, 58 (see FIG. 1). The prior pathways 52, 54, 56, 58 may be representations gleaned from the polarization information to reflect how other vehicles 10 previously traversed the roadway 14, i.e., how vehicles 10 preceding the vehicle 10 navigated the roadway 14, and optionally an obstacle 626 therein. The prior pathways 52, 54, 56, 58 are shown for non-limiting purposes as including a first pathway 52, a second pathway 54, a third pathway 56, and a fourth pathway 58 to represent four different pathways 52, 54, 56, 58 determined from the prior controller processing the polarized images. Each of the pathways 52, 54, 56, 58 may be determined based on surface influences imposed upon the roadway 14 as a result of the other vehicles 10 previously traveling thereover. The different paths 52, 54, 56, 58 may be determined according to a surface differentiation process whereby the prior controller 48 may utilize the polarization information to assess surface quality along different portions of the roadway 14, and based on a relative differentiation therebetween, to estimate or calculate the prior pathways 52, 54, 56, 58. The obstacles 62 and/or the lane markers 20, 22, 24 may be determined from the polarized images in a similar manner.

The prior controller 48 may include or cooperate an imaging module 66 configured to categorize or otherwise manipulate the polarization information included within each of the polarized images, such as to generate a data construct sufficient for use by the prior controller 48 in identifying the prior pathways 52, 54, 56, 58. The imaging module 66 may process the polarized images from different points in time, such as in-real time as the vehicle 10 is actively traveling over the roadway 14. The imaging module 66, for example, may be configured for stitching together or otherwise generating a sequence between the polarized images operable for providing a series of surface quality assessments of the roadway 14 as the vehicle 10 is traveling there towards. The prior controller 48 may be configured to use the corresponding information to differentiate and separate one pathway 52, 54, 56, 58 from another. The exemplary illustration depicts four pathways 52, 54, 56, 58 for the sake of simplicity as the prior controller 48 may be configured to detect more or less pathways 52, 54, 56, 58. The four illustrated pathways 52, 54, 56, 58 may be individually associated with multiple vehicles 10, i.e., four or more vehicles 10 may have similarly traveled the same or similar pathways 52, 54, 56, 58 such the represented pathways 52, 54, 56, 58 may be the result of surface affects induced by multiple vehicles 10.

The prior controller 48 may be configured to facilitate processing the individual pathways 52, 54, 56, 58 to identify the pathway 58 as a dominant pathway 58. The dominant pathway 58 may correspond with a one or more of the pathways 52, 54, 56, 58 associated with the most commonly traversed portion(s) of the roadway 14, which may correspond with the most polarized part of the roadway 14. The dominant pathway 58 may correspond with a single pathway, i.e., the one most used, or an averaging or other mathematical representation of multiple pathways 52, 54, 56, 58. The prior controller 48 may perform statistical processing to discard outlying or abnormal pathways 52, 54, 56, 58, such as the first pathway 52, and thereafter process the relevant pathways 52, 54, 56, 58 to identify the dominant pathway 58. The dominant pathway 58, as such, may represent an ideal or a desired pathway calculated to represent a suitable trajectory over the roadway 14 based on how the other vehicles 10 traversed the same roadway 14. The capabilities of the present disclosure to identify the prior pathways 52, 54, 56, 58 may be beneficial in enabling the trajectory planning system 12 to provide a passive or a non-invasive methodology for identifying routes over the roadway 14 without the trajectory planning system 12 having to actively monitor or communicate with or otherwise collect information from the other vehicles 10.

The prior controller 48 may be configured to detect roadway obstacles, obstructions, artifacts, discontinuities, etc. from the polarized images, such as but not necessarily limited to the obstacle 62. The prior controller 48 may be configured to utilize RGB information generated with the RGB camera system 36 to facilitate detecting, converting confirming, enhancing, verifying, or otherwise assessing the prior pathways 52, 54, 56, 58, lane markers 20, 22, 24, the obstacles 62, and/or other optical determinations generated as a result of the polarization information, i.e., the polarized images. The RGB camera system 36 may include one or more cameras (not shown) configured to capture RGB images of the environment associated with the vehicle 10. The RGB camera system 36, for example, may be configured to capture RGB images for the roadway 14, optionally using integrated cameras having capabilities to capture both of the polarized images and the RGB images. The RGB images may be similarly captured on a frame-by-frame basis or other interval as the vehicle 10 travel upon the roadway 14, e.g., the RGB camera system may be configured to capture the RGB images at rate of n frames per second (FPS) from one or more RGB cameras. The RGB images may capture RGB information for the roadway 14 and other portions of the environment within the field of view of the corresponding camera.

The imaging module 66 may be configured to combine the polarized images with the RGB images to create multilayered images. The multilayered images may include a polarization layer in one or more color-based layers for each of the RGB images, and optionally additional color layers, such as an additional green layer in the event of the camera system 36 capturing RGGP images. The multilayer images may be aligned or matched for corresponding portions of the roadway 14, with the resulting multilayer images including polarization information RGB or other visual information, which when combined together, may provide an enhanced view of the roadway 14. The imaging module 66 may be configured to provide the multilayered images to the prior controller 48 for use in identifying the prior pathways 52, 54, 56, 58, the obstacles, and/or additional items within the field of view thereof. The prior controller 48 may correspondingly generate the prior to represent the prior pathways 52, 54, 56, 58, identify the dominant pathway 58 for other pathway of interest, the obstacle, etc. using the polarized images by themselves and/or in combination with the RGB images, i.e., as a function of the multilayered images.

The trajectory planning system 12 may include the driving assistance system 42 to generate and provide a driving assistance according to the prior. The driving assistance, for example, may be used to provide guidance for driving the vehicle 10 over the roadway 14 relative to one or more of the prior pathways 52, 54, 56, 58, the dominant pathway 58, the obstacles 62, etc. The driving assistance system 42 may be configured to interface the driving assistance with a driver of the vehicle 10 through the display system 44 and/or with the automated driving system 46. The driving assistance may be configured to guide the vehicle 10 relative to the dominant pathway 58 by providing one or more driving directions to the automated driving system 46, which may in turn instruct the automated driving system to autonomously navigate the vehicle 10 along the dominant pathway 58. The automated driving system 46 may use the driving assistance in this manner to facilitate autonomously controlling the vehicle 10 along the dominant pathway 58, or another selected pathway, while also avoiding the obstacles 62, remaining within the lane markers 20, 22, 24, and traversing the roadway 14 in a manner similar to the preceding vehicles 10.

Figure 3:
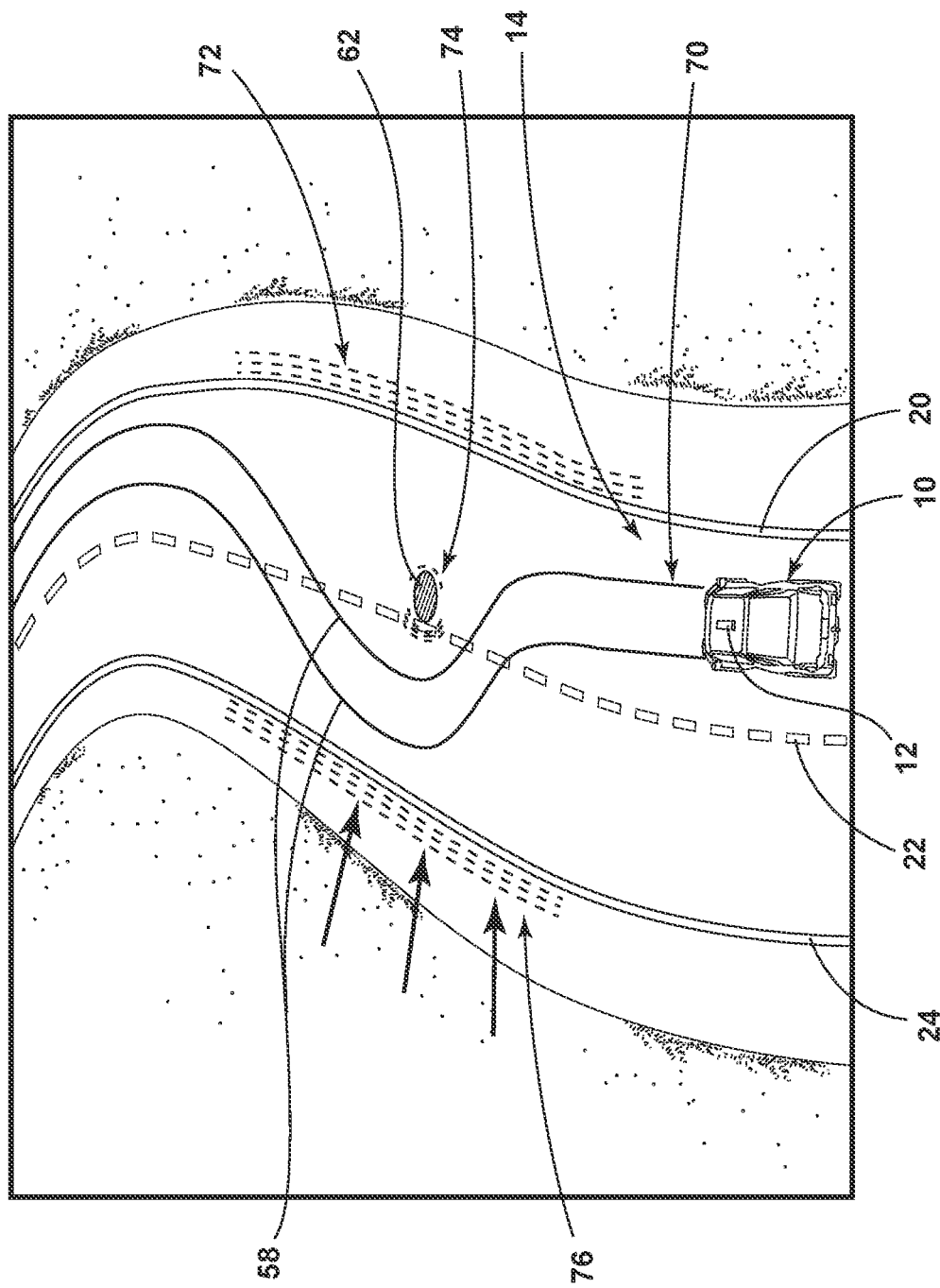
FIG. 3 illustrates a schematic view of a driving assistance in accordance with one non-limiting aspect of the present disclosure.

FIG. 3 illustrates a schematic view of the driving assistance being configured to identify the dominant pathway 58, the obstacle 62, and the lane markers 20, 22, 24 with a plurality of visual cues 70, 72, 74, 76. The visual cues 70, 72, 74, 76 may be interface with the driver through a heads up display (HUD) system, an infotainment system, and/or an augmented reality system (not shown). The visual cues 70, 72, 74, 76 may include a route highlight 70 configured to identify the dominant pathway 58, the obstacle's valence lines 74 may be configured to identify the obstacle, and a plurality of valence lines 72, 76 may be configured to visually represent a relationship, or valence, between an object and the subject in terms of positive (attraction) or negative (rejection) properties, i.e., the spacing, curvature, quantity, etc. may be utilized in the illustrated manner to visually compel the driver to navigate the vehicle 10 without interceding or otherwise taking over control of the vehicle 10. The driver, in other words, may look at the visual cues 70, 72, 74, 76 and implement corresponding control of the vehicle 10 as the driver sees fit. The schematic view of FIG. 3 is presented as a top-down view for exemplary purposes as the present disclosure fully contemplates other capabilities for interfacing the visual cues 70, 72, 74, 76 with the driver or other vehicle 10 occupants.

Figure 6:
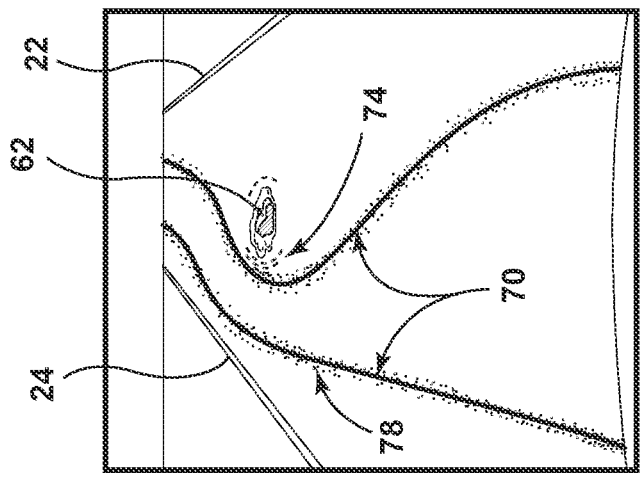
FIG. 6 illustrates the assisted view of the roadway in accordance with one non-limiting aspect of the present disclosure.
Figure 5:
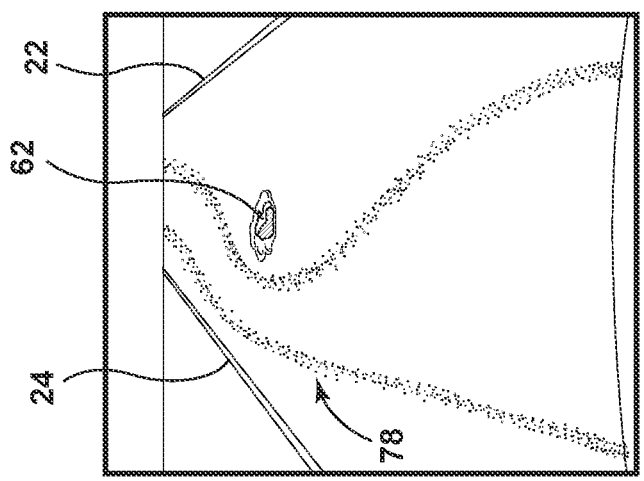
FIG. 5 illustrates an assisted view of the roadway in accordance with one non-limiting aspect of the present disclosure.
Figure 4:
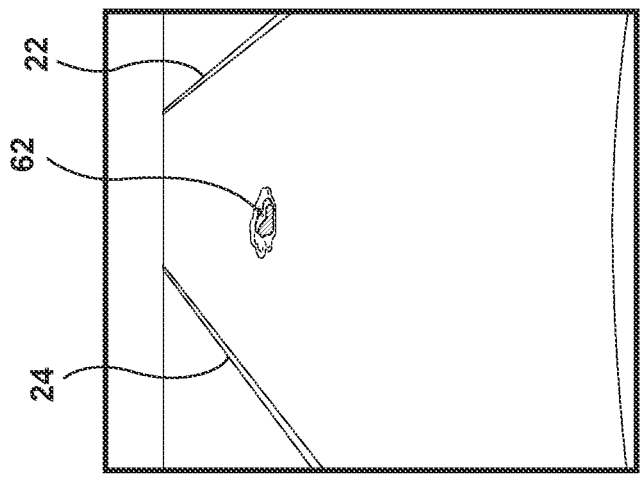
FIG. 4 illustrates an unassisted view of a roadway in accordance with one non-limiting aspect of the present disclosure.

One of non-limiting aspect of the present disclosure contemplates utilizing the visual clues 70, 72, 74, 76 with the display system 44 to provide a heads up display or an augmented reality display for assisting the driver in navigating the vehicle 10. FIG. 4 illustrates an unassisted view of the roadway 14, which may be generated by the display system 44 from the RGB images. The unassisted view may include the obstacle 62. FIG. 5 illustrates an assisted view of the roadway 14, which may be generated by the display system 44 utilizing the visual clues 70, 72, 74, 76 to generate a pathway amplification 78 for the prior pathways 52, 54, 56, 58. The pathway amplification 78 may be an additional one of the visual cues 70, 72, 74, 76 and configured as a clustered pattern of dots arranged to amplify one or more of the prior pathways 52, 54, 56, 58. FIG. 6 illustrates the assisted view of the roadway 14 additionally including visual cues 70, 72, 74, 76 to represent the dominant pathway route highlight 70 and the valence lines 74 for the obstacle 62.

Figure 7:
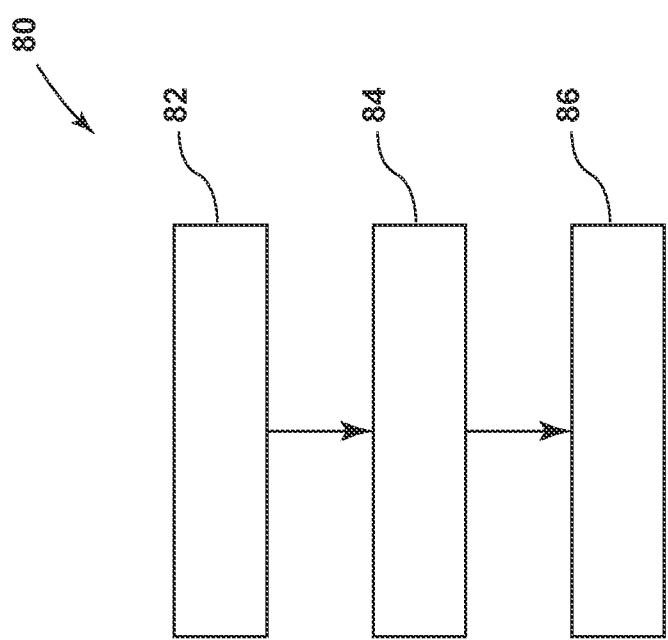
FIG. 7 illustrates a flowchart of the method for vehicle trajectory planning in accordance with one non-limiting aspect of the present disclosure.

FIG. 7 illustrates a flowchart 80 of the method for vehicle 10 trajectory planning in accordance with one non-limiting aspect of the present disclosure. Block 82 relates to an image capture process whereby the polarized and/or the RGB camera systems 34, 36 may be configured to facilitate capturing polarized and/or RGB images of the roadway 14, such as in real time as the vehicle 10 is traveling upon the roadway 14. Block 84 relates to a prior generation process whereby the prior controller 48 may be configured to generate the prior for the roadway 14 as a function of the polarization and/or RGB information included within the polarized and/or RGB images. The prior may be configured to represent one or more pathways 52, 54, 56, 58, obstacles 62, lane markers 20, 22, 24, etc. for the roadway 14. Block 86 relates to a driving assistance process for providing guidance to a driver and/or the automated driving system 46 according to one or more of the pathways 52, 54, 56, 58, obstacles 62, lane markers 20, 22, 24, etc. represented within the prior.

The terms "comprising", "including", and "having" are inclusive and therefore specify the presence of stated features, steps, operations, elements, or components, but do not preclude the presence or addition of one or more other features, steps, operations, elements, or components. Orders of steps, processes, and operations may be altered when possible, and additional or alternative steps may be employed. As used in this specification, the term "or" includes any one and all combinations of the associated listed items. The term "any of" is understood to include any possible combination of referenced items, including "any one of" the referenced items. "A", "an", "the", "at least one", and "one or more" are used interchangeably to indicate that at least one of the items is present. A plurality of such items may be present unless the context clearly indicates otherwise. All numerical values of parameters (e.g., of quantities or conditions), unless otherwise indicated expressly or clearly in view of the context, including the appended claims, are to be understood as being modified in all instances by the term "about" whether or not "about" actually appears before the numerical value. A component that is "configured to" perform a specified function is capable of performing the specified function without alteration, rather than merely having potential to perform the specified function after further modification. In other words, the described hardware, when expressly configured to perform the specified function, is specifically selected, created, implemented, utilized, programmed, and/or designed for the purpose of performing the specified function.

While various embodiments have been described, the description is intended to be exemplary, rather than limiting and it will be apparent to those of ordinary skill in the art that many more embodiments and implementations are possible that are within the scope of the embodiments. Any feature of any embodiment may be used in combination with or substituted for any other feature or element in any other embodiment unless specifically restricted. Accordingly, the embodiments are not to be restricted except in light of the attached claims and their equivalents. Also, various modifications and changes may be made within the scope of the attached claims. Although several modes for carrying out the many aspects of the present teachings have been described in detail, those familiar with the art to which these teachings relate will recognize various alternative aspects for practicing the present teachings that are within the scope of the appended claims. It is intended that all matter contained in the above description or shown in the accompanying drawings shall be interpreted as illustrative and exemplary of the entire range of alternative embodiments that an ordinarily skilled artisan would recognize as implied by, structurally and/or functionally equivalent to, or otherwise rendered obvious based upon the included content, and not as limited solely to those explicitly depicted and/or described embodiments.

What is claimed is:

1. A system for vehicle trajectory planning, comprising:
   a polarized camera system configured to generate polarized images of a roadway to be driven over with a vehicle, the polarized images capturing polarization information for the roadway;
   a prior controller configured to generate a prior for the roadway based at least in part on the polarization information, the prior representing one or more prior pathways other vehicles previously traversed when traveling over the roadway; and
   a driving assistance system configured to provide a driving assistance according to the prior, the driving assistance providing guidance for driving the vehicle over the roadway relative to one or more of the prior pathways;
   wherein the prior controller is configured to determine surface quality for the one or more prior pathways based at least in part on an angle of linear polarization (AoLP) and a degree of linear polarization (DoLP) captured with the polarized images, and
   wherein the prior controller is configured to identify in the prior a dominant pathway of the prior pathways based on a differentiation in the surface qualities of the prior pathways.

2. The system according to claim 1, wherein:
   the prior is configured to identify a dominant pathway of the prior pathways, the dominant pathway representing the one of the prior pathways most traversed by the other vehicles.

3. The system according to claim 2, wherein:
   the driving assistance is configured to guide the vehicle relative to the dominant pathway by providing one or more visual cues to a driver of the vehicle.

4. The system according to claim 3, wherein:
   the prior is configured to additionally represent one or more obstacles within the roadway.

5. The system according to claim 4, wherein:
   the driving assistance is configured to generate one or more of the visual cues to guide the vehicle relative to the obstacles.

6. The system according to claim 5, wherein:
   the visual cues include a pathway representation and one or more valence lines, the pathway representation visually identifying the dominant pathway, the valences visually identifying the proximity and relation of the vehicle to the obstacles.

7. The system according to claim 2, wherein:
   the driving assistance is configured to guide the vehicle relative to the dominant pathway by providing one or more driving directions to an automated driving system of the vehicle.

8. The system according to claim 7, wherein:
   the driving directions instruct the automated driving system to autonomously navigate the vehicle along the dominant pathway.

9. The system according to claim 2, wherein:
   the prior is configured to identify the dominant pathway as a most polarized one of the prior pathways.

10. The system according to claim 1, further comprising:
    a red, green, and blue (RGB) camera system configured to generate RGB images of the roadway; and
    an imaging module configured to combine corresponding ones of the polarized images and the RGB image to generate layered images of the roadway, the layered images each including a polarized layer, a red layer, a green layer, and a blue layer.

11. The system according to claim 10, wherein:
    the prior controller is configured to generate the prior from the layered images and to identify in a dominant pathway of the prior pathways, the dominant pathway representing the one of the prior pathways most traversed by the other vehicles;
    a lane detection system configured to generate lane markers from the layered images, the lane markers representing driving lanes included on the roadway;
    an obstacle detection system configured to generate obstacle markers from the layered images, the obstacle markers representing obstacles included on the roadway; and
    the driving assistance is configured to provide one or more visual cues for guiding the vehicle, the visual cues visually identifying to a driver of the vehicle the dominant pathway, the lane markers, and the obstacles.

12. The system according to claim 11, further comprising:
    a display system configured to display the visual cues to the driver through a heads up display (HUD) system, an infotainment system, and/or an augmented reality system onboard the vehicle.

13. The system of claim 1, wherein the polarized camera system is further configured to generate the polarized images in real time.

14. A system for vehicle trajectory planning, comprising:
    a polarized camera system configured to generate polarized images of a roadway to be driven over with a vehicle;
    a red, green, and blue (RGB) camera system configured to generate RGB images of the roadway;
    an imaging module configured to combine corresponding ones of the polarized images and the RGB image to generate layered images of the roadway;
    a prior controller configured to:
        generate a prior for the roadway from the layered images, the prior representing one or more prior pathways other vehicles previously traversed when traveling over the roadway and one or more obstacles within the roadway;

determine a surface quality for the one or more prior pathways based at least in part on an angle of linear polarization (AoLP) and a degree of linear polarization (DoLP) captured with the polarized images; and identify in a dominant pathway based on a differentiation in the surface qualities of the prior pathways, the dominant pathway being a most traveled one of the prior pathways; and a driving assistance system configured to provide a driving assistance according to the prior, the driving assistance providing guidance for driving the vehicle over the roadway relative to the obstacles and one or more of the prior pathways.

15. The system according to claim 14, wherein:
the driving assistance is configured to guide the vehicle relative to the dominant pathway and the obstacles by providing one or more visual cues to a driver of the vehicle.

16. The system according to claim 14, wherein:
the driving assistance is configured to guide the vehicle relative to the dominant pathway and the obstacles by providing one or more driving directions to an automated driving system of the vehicle.

17. The system of claim 14, wherein the polarized camera system is further configured to generate the polarized images in real time.

18. A system for vehicle trajectory planning, comprising:
a polarized camera system configured to generate polarized images of a roadway to be driven over with a vehicle;
a prior controller configured to:
    determine one or more prior pathways other vehicles previously traversed when traveling over the roadway based at least in part on determining a surface quality for the one or more prior pathways based on an angle of linear polarization (AoLP) and a degree of linear polarization (DoLP) captured with each of the polarized images; and
    identify within a prior a dominant pathway of the prior pathways, based on a differentiation in the surface qualities of the prior pathways, as a one of the prior pathways most traversed by the other vehicles; and
a driving assistance system configured to generate one or more visual cues according to the prior, the visual cues providing visual guidance to driver of the vehicle to assist in driving the vehicle over the roadway relative to the dominant pathway.

19. The system according to claim 18, further comprising:
a display system configured to display the visual cues to the driver through a heads up display (HUD) system, an infotainment system, and/or an augmented reality system onboard the vehicle.

20. The system of claim 18, wherein the polarized camera system is further configured to generate the polarized images in real time.

* * * * *